United States Patent [19]

Chen

[11] Patent Number: 5,182,024
[45] Date of Patent: Jan. 26, 1993

[54] SEPARATION OF HYDROCARBON DEWAXING AND DEASPHALTING SOLVENTS FROM DEWAXED AND/OR DEASPHALTED OIL USING INTERFACIALLY POLYMERIZED MEMBRANE

[75] Inventor: Tan-Jen Chen, Clearwater, Canada

[73] Assignee: Exxon Research and Engineering Company, Florham Park, N.J.

[21] Appl. No.: 622,449

[22] Filed: Dec. 5, 1990

[51] Int. Cl.⁵ .................... B01D 61/02; B01D 71/60
[52] U.S. Cl. .................. 210/654; 210/500.37
[58] Field of Search ............ 210/654, 651, 634, 644, 210/649, 650, 652, 653, 500.37, 500.38, 500.39

[56] References Cited

U.S. PATENT DOCUMENTS

| | | | |
|---|---|---|---|
| 3,370,102 | 2/1968 | Carpenter et al. | 260/674 |
| 3,728,311 | 4/1973 | Park | 260/77.5 |
| 3,744,642 | 7/1973 | Scala et al. | 210/500 |
| 3,773,848 | 11/1973 | Perry et al. | 260/681.5 |
| 3,935,172 | 1/1976 | Vogl et al. | 260/78 |
| 3,951,815 | 4/1976 | Wrasidlo | 210/500 |
| 4,002,563 | 1/1977 | Vogl et al. | 210/23 |
| 4,277,344 | 7/1981 | Cadotte | 210/654 |
| 4,368,112 | 1/1983 | Thompson et al. | 208/31 |
| 4,464,494 | 8/1984 | King et al. | 523/400 |
| 4,510,047 | 4/1985 | Thompson | 208/321 |
| 4,582,726 | 4/1986 | Shuey et al. | 427/208.8 |
| 4,595,507 | 6/1986 | Chang et al. | 210/632 |
| 4,617,126 | 10/1986 | Funk et al. | 210/651 |
| 4,626,468 | 12/1986 | Sundet | 428/315.5 |
| 4,690,765 | 9/1987 | Linder et al. | 210/654 |
| 4,690,766 | 9/1987 | Linder et al. | 210/654 |
| 4,715,960 | 12/1987 | Thompson | 210/651 |
| 4,769,148 | 9/1988 | Fibiger et al. | 210/500.38 |
| 4,792,404 | 12/1988 | Swedo et al. | 210/654 |
| 4,928,051 | 1/1991 | Pasternak | 585/818 |
| 4,985,138 | 1/1991 | Pasternak | 208/308 |

FOREIGN PATENT DOCUMENTS

| | | |
|---|---|---|
| 211633 | 2/1987 | European Pat. Off. . |
| 312376 | 4/1989 | European Pat. Off. . |
| 2111889 | 9/1977 | Japan . |
| 2191006 | 8/1987 | Japan . |
| 2247808 | 10/1987 | Japan . |
| 130105 | 6/1988 | Japan . |

OTHER PUBLICATIONS

"In Situ-Formed Condensation Polymers for Reverse Osmosis Membranes: Second Phase" North Star Research Institute, Dept. of Interior NTIS Pub #PB 234198.

"Continued Evaluation of In Situ-Formed Condensation Polymers for Reverse Osmosis Membranes" Midwest Research Inst. US Dept of Comm. NTIS Pub #PB 253193.

Primary Examiner—Frank Sever
Attorney, Agent, or Firm—Joseph J. Allocca

[57] ABSTRACT

Hydrocarbon solvents used or the dewaxing and/or deasphalting of oils can be recovered by the selective permeation of said solvents through an interfacially polymerized membrane under reverse osmosis conditions.

7 Claims, No Drawings

SEPARATION OF HYDROCARBON DEWAXING AND DEASPHALTING SOLVENTS FROM DEWAXED AND/OR DEASPHALTED OIL USING INTERFACIALLY POLYMERIZED MEMBRANE

DESCRIPTION OF THE INVENTION

Hydrocarbon solvents used for dewaxing and/or deasphalting oils can be recovered by the selective permeation of the solvent through an interfacially polymerized membrane under reverse osmosis conditions.

The hydrocarbon solvents which can be received are the $C_3$ to $C_6$ aliphatic alkanes and alkenes, i.e., propane, propylene, butane, butene, hexane, hexene, heptane, heptene and mixtures thereof, preferably the $C_3$–$C_4$ alkanes and alkenes and mixtures thereof, most preferably propane, butane and mixtures thereof.

These solvents are employed for the dewaxing and/or deasphalting of hydrocarbon oils, e.g., lubes and specialty oils, transformer oils, refrigerator oils, turbine oils, as well as the dewaxing of fuels fraction such as diesel, and jet. The hydrocarbon oils can come from any natural or synthetic source. Mineral oil distillates or hydrocracked oils ranging from light fuels fractions to Bright Stocks are dewaxed and/or deasphalted by the techniques known in the art. Similarly oils obtained by the isomerization of natural slack waxes or Fischer-Tropsch waxes as well as oils obtained from tar sands, coal liquification, and shale can be subjected to treatment as needed.

The $C_3$ to $C_6$ hydrocarbon solvents are recovered for use by the selective permeation of the solvent through an interfacially polymerized membrane.

The membranes are prepared by depositing an aqueous (or conversely non-aqueous) solution of a first reactant component on the microporous backing support layer, draining off the excess quantity of this first solution and then applying a second reactant component in the form of a non-aqueous (or conversely aqueous) solution. The two components interact and polymerize at the interface between the aqueous phase and the non-aqueous phase to produce a highly crosslinked thin polymer layer on the microporous ultrafiltration support backing layer.

In this invention the membranes are generally prepared by reacting multi-functional amino compounds dissolved in water with a second polyfunctional agent dissolved in organic solvents. The amino compounds can be aliphatic, alicyclic or aromatic. The polyfunctional agents with which the amines are reacted can include di- and tri- acid halides, acid anhydrides, aliphatic and aromatic diisocyanates, thioisocyanates, haloformates and sulfonyl halides. Backings which can be used include nylon (e.g., nylon 66), cellulose, polyester, teflon, polypropylene and other insoluble polymers.

BACKGROUND OF THE INVENTION

The separation and recovery of $C_3$–$C_6$ hydrocarbon dewaxing and/or deasphalting solvents from dewaxed and/or deasphalted oils is an important process consideration. It is uneconomical to simply discard the solvents after one use and similarly, in most applications their continued presence in the product oil can give rise to product quality concerns.

Such solvents have been recovered by simple distillation as well as by the simple expedient of permitting the normally gaseous solvents such as propane and butane merely vaporize. Such processes are not efficient requiring the expenditure of considerable energy to affect the distillates and, in the case of propane and butane, the recompression of the solvents before reuse is possible.

The recovery of such solvents by more energy efficient means has been explored. The use of membranes to effect the separation has generated much interest.

In U.S. Pat. No. 4,595,507 it is taught that mixtures of heavy oils and light hydrocarbons may be separated by passing the mixture through a polymeric membrane. The membrane used comprises a polymer which is capable of maintaining its integrity in the presence of hydrocarbon compounds and which has been modified by being subjected to the action of a sulfonating agent. Sulfonation agents include fuming sulfuric acid, chlorosulfonic acid, sulfur trioxides, etc. The surface or bulk modified polymer will contain a degree of sulfonation ranging from about 15% to about 50%. The separation process is affected at temperatures ranging from about ambient to about 100° C. and pressures ranging from about 50 to 1000 psig. The process is described as useful for separating heavy oils from relatively light hydrocarbons which have been used as solvents in the various hydrocarbon treatment processes. The light hydrocarbon is recovered as the permeate. The membrane used may pass a wide range of pore sizes ranging from about 10 to about 500 Angstroms. The membranes are made from polymers which have the light hydrocarbon solvents in order to avoid dissolution of the membrane in the solvent. The membranes are made from polymers having solubility parameters in excess of about 9.0. Membranes which can be used include those made from polysulfone, polycarbonate, cellulose acetate, polyacrylonitrile, polyvinyl alcohol, Nylon 6,6, Nylon 8, cellulose, polybenzoimidazole, polyamide, polyimide, polytetrafluoroethylene.

U.S. Pat. No. 4,617,126 teaches that mixtures of heavy oil and light hydrocarbons may be separated by passing the mixture over a polymeric membrane which comprises a polymer capable of maintaining its integrity in the presence of hydrocarbon compounds at temperatures ranging from about ambient to about $100^6$ C. and pressures ranging from about 50 to 1000 psi. The membranes passes pore sizes ranging from about 10 to about 500 Angstroms and are cast from a solution.

The membrane is made from polymeric material which, having a different solubility parameter than the light hydrocarbon, does not dissolve in the light hydrocarbon. The polymers possess solubility parameters in excess of about 9.0 and includes polysulfone, polycarbonate, cellulose acetate, polyacrylonitrile, polyvinyl alcohol, Nylon 6,6, Nylon 8, cellulose, polybenzoimidazole, polyamide, polyimide, polytetrafluoroethylene.

The solvents recovered can include ethanol, propanol, butanol, propane, n-pentane, iso-pentane, n-hexane, n-heptane. The membranes are prepared by dissolving the polymer on a casting solvent to produce a casting solution. The casting solvent include N-methyl-2-pyrrolidone, dimethyl formamide, dimethylsulfoxide, dichloromethane, dichloroethane, chloroform, methyl cellusolve, propylene glycol or mixtures thereof such as DMF/methyl cellusolve, NMP/propylene glycol, NMP/DMSO, etc.

Interfacially polymerized membranes were initially discovered in the 1970's for use in water desalination (see "In Situ-formed Condensation Polymers for Reverse Osmosis Membranes: Second Phase", North Star Research Institute, prepared for Department of the Interior, July 1974, available from NTIS, report #PB-234 198; "Continued Evaluation of In Situ-formed Condensation Polymers for Reverse Osmosis Membranes", Midwest Research Institute, prepared for Office of Water Research and Technology, April 1976, available from NTIS, report #PB-253 193; "Interfacially Synthesized Reverse Osmosis Membrane", U.S. Pat. No. 4,277,344, July 7, 1981, assn. to Film Tec Corporation). Prior art only describes the use of these membranes for the separation of aqueous solutions by reverse osmosis.

Interfacially polymerized membranes are composed of a highly crosslinked and generally insoluble condensation polymer which is formed in situ on a micro-porous film. Most of these membranes are formed with di- or polyamines which are reacted with multi-functional iso-cyanates or acid chlorides. Amines react very readily with both of these reactants. Several of these membranes have been commercialized for water desalination purposes by companies such as UOP, Film Tec and Desalination Systems Inc. All of the commercial membranes use a polysulfone ultrafiltration membrane (0.02 to 0.1 micron pore size) for the microporous support film. Prior art does describe the use of some other microporous support films such as polyvinylchloride ultrafiltration membranes.

These membranes are formed by using the following procedures. A thin layer of a dilute solution of one component, usually an aqueous solution of the amine, is put on one side of the microporous support film. A thin layer of a dilute solution of the second component, usually in a water immersible solvent, is then put on top of the water solution layer. The order of applying the solutions can be reversed. The two components react at the water/solvent interface forming a thin (less than 1 micron thick) highly crosslinked polymer layer. This polymer layer is the active layer of the membrane at which separation occurs. Some examples of formulations mentioned in the prior art are reacting polyethylenimine with toluene diisocyanate, reacting polyethylenimine with isophthaloyl dichloride and reacting m-phenylene diamine with trimesoyl chloride.

These membranes exhibit high salt rejections from water (>95%).

THE PRESENT INVENTION

It is an object of the present invention to recover $C_2$–$C_6$ hydrocarbon dewaxing and/or deasphalting solvents, and mixtures thereof from dewaxed and/or deasphalted oils by the selective permeation of said solvent through an interfacially polymerized membrane under reverse osmosis conditions. In the present invention the interfacially polymerized membranes are prepared by reacting multi-functional amino reactants dissolved in water with other polyfunctional agent reactants dissolved in organic solvents. The interfacially polymerized membrane is produced on a non-selective, microporous ultrafiltration support layer which is inert in the organic media to which it will be exposed. This support layer is selected from nylon, cellulose, polyester, teflon, polypropylene polyethylene, polyethylene terephthalate, etc., ultrafiltration membranes having pores in the range 0.02 to 0.1 microns.

A few examples of multi-functional amino group reactants include polyethylenimine, polyvinylamine, polyvinylanilines, polybenzylamines, polyvinylimidazolines, amine modified polyepihalohydrins, and other amine containing polymers, m-phenylene diamine, p-phenylene diamine, triaminobenzene, piperazine, piperidine, 2,4-bis (p-aminobenzyl) aniline, cyclohexane diamine, cycloheptane diamine, etc., and mixtures thereof.

The polyfunctional agents that the amines are reacted with can include di- and tri- acid halides, (e.g., chlorides), acid anhydrides, aliphatic and aromatic diisocyanates, thioisocyanates, haloformates (e.g., chloroformates) and sulfonyl halides (e.g., sulfonyl chlorides), and mixtures thereof. A few examples of these agents are trimesoyl chloride, cyclohexane-1,3,5 tricarbonyl chloride, isophthaloyl chloride, terephthaloyl chloride, diisocyanatohexane, cyanuric chloride, diphenylether disulfonyl chloride, formyl chloride, acetyl chloride, propionyl chloride, butyryl chloride, valeryl chloride, caproyl chloride, heptanoyl chloride, octanoyl chloride, pelargonyl chloride, capryl chloride, lauryl chloride, myristyl chloride, palmityl chloride, margaryl chloride, stearyl chloride, etc., oxalyl chloride, malonyl chloride, succinyl chloride, glutaryl chloride, fumaryl chloride, glutaconyl chloride, acetic anhydride, propionic anhydride, butyric anhydride, phthalic anhydride, ethylene diisocyanate, propylene diisocyanate, benzene diisocyanate, toluene diisocyanate, naphthalene diisocyanate, methylene bis (4-phenylisocyanate), ethylene thioisocyanate, toluene thioisocyanate, naphthalene thioisocyanate, ethylene bischloroformate, propylene bischloroformate, butylene bischloroformate, 1,3-benzenedisulfonyl chloride, 1,4 benzene disulfonyl chloride, 1,3-naphthalene disulfonyl chloride and 1,4-naphthalenedisulfonyl chloride, etc., and mixtures thereof.

A crosslinked membrane is used in the present invention to ensure stability. A crosslinked polymeric film is formed if these membranes are prepared with one of the reagents being at least trifunctional. The degree of crosslinking is primarily controlled by the concentration of the reactant solution with higher concentrations leading to higher degrees of crosslinking.

In general the interfacially polymerized membranes are produced using 0.1 to 10 wt% aqueous solutions of the amines, preferably 0.25 to 5 wt% aqueous solutions of the amines; and 0.1 to 5 wt% non-aqueous solutions of the poly-functional agents, preferably 0.15 to 0.5 wt% non-aqueous solution of the poly-functional agent.

Following the sequential deposition of the two solutions, the resulting film can be heated to promote crosslinking of any unreacted amine. This post heating step can be at a temperature of about 60 to 150° C., preferably 80 to 120° C. for from 1 to 20 minutes. The concentrations of components used and drying/crosslinking times and temperatures will be selected from the above ranges by the practitioner in response to the membrane casting procedures actually employed and the casting machines or other mechanisms or equipment used.

The $C_3$–$C_6$ and mixtures thereof hydrocarbon dewaxing and/or deasphalting solvents are selectively permeated through the interfacially polymerized membranes under reverse osmosis conditions.

Reverse osmosis conditions include contacting the then, interfacially polymerized crosslinked face of the membrane with the affinate phase, extract phase, or both, preferably extract phase at a temperature between about −24 to 200° C., preferably 40 to 150° C. and under an applied pressure sufficient to overcome the osmotic pressure. Pressures on the order of 0 to 1000 psig can be used, preferably about 400 to 600 psig.

The separation process could employ the interfacially polymerized membrane in the form of a spiral wound element. Fabrication of a spiral wound element would employ adhesives as disclosed in U.S. Pat. Nos. 4,464,494 and 4,582,726, hereby incorporated by reference.

EXAMPLES

Two interfacially polymerized membranes were prepared designated Membrane A and Membrane B. The membranes were prepared as follows:

Membrane A

Dissolve 4.00 grams of phenylene diamine (PDA) from Aldrich in 100 grams of deionized water.

Dissolve 0.15 grams of trimesoyl chloride (TMC) from Aldrich in 100 grams of hexane.

Install a disc of the 0.04 μm Ultipor nylon 66 membrane in a wash coat cell, leave one side of the membrane exposed.

Pour the PDA solution over the exposed side of the membrane.

Drain off excess solution for one minute.

Pour the TMC solution over the exposed side.

Drain off the excess solution for one minute.

Bake the nylon membrane in an oven at 110° C. for 10 minutes.

Membrane B

Dissolve 0.50 grams of PEI in 100 grams of deionized water.

Dissolve 0.50 grams of TDI in 100 grams of toluene.

Install a disc of the 0.04 μm Ultipor nylon 66 membrane in a wash coat cell, leave one side of the membrane exposed.

Pour the PEI solution over the exposed side of the membrane.

Drain off excess solution for one minute.

Pour the TDI solution over the exposed side.

Drain off the excess solution for one minute.

Bake the nylon membrane in an oven at 110° C. for 10 minutes.

PEI = polyethylenimine (Aldrich #18, 197-8)
TDI = toluene diisocyanate (BASF)

These membranes were evaluated for the separation of propane from a deasphalted oil. The oil was a Singapore 2500 Neutral deasphalted oil. The feeds used to evaluate Membrane A and B ranged from 8-19.6 wt % oil.

The results are presented below.

| Membrane | A | B | B |
|---|---|---|---|
| Temperature °C.: | 60 | 60 | 60 |
| Feed Pressure, psi | 950 | 450 | 600 |
| Permeate Pressure, psi | 350 | 350 | 350 |
| Feed Oil Concentration, wt % | 8 | 13 | 19.6 |
| Performance | | | |
| Flux, L/M$^2$-Day | 510,000 | 20,950 | 130,500 |
| Oil Rejection, % | 29 | 73 | 65 |

What is claimed is:

1. A method comprising separating hydrocarbon solvents used for dewaxing and/or deasphalting oils from said dewaxed and/or deasphalted oil by contacting the dewaxed and/or deasphalted oil containing hydrocarbon solvent selected from the group consisting of $C_3$ to $C_6$ alkane or alkene and mixtures thereof with an interfacially polymerized membrane on microporous ultrafiltration support baking under reverse osmosis conditions, said interfacially polymerized membrane comprising the reaction product of a multifunctional amino compound dissolved in water with a polyfunctional agent dissolved in an organic solvent.

2. The method of claim 1 wherein the multi-functional amino group reactant is selected from polyethylenimine, polyvinylamine, polyvinylaniline, polybenzylamine, polyvinylimidazolines, amine modified polyepihalohydrines, m-phenylenediamine, p-phenylenediamine, triaminobenzene, piperazine, piperidine, 2,4-bis(p-aminobenzyl) aniline, cyclohexane diamine, cycloheptane diamine and mixtures thereof.

3. The method of claim 1 wherein the polyfunctional agent is selected from di- and tri- acid halides, acid anhydrides, aliphatic diisocyanates, aromatic diisocyanates, thioisocyanates, haloformate, sulfonylhalides and mixtures thereof.

4. The method of claims 1, 2 or 3 wherein the multifunctional amine compound in water is at a concentration of 0.1 to 10 wt % and the polyfunctional agent reactant in organic solvent is at a concentration of 0.1 to 5 wt %.

5. The method of claim 4 wherein the backing is selected from polyamide cellulose, polyester, polytetrafluorethylene, polypropylene, polyethylene, ultrafiltration membranes.

6. The method of claim 5 wherein the ultrafiltation membrane support layer has pores in the range 0.02 to 0.1 microns.

7. The method of claim 1, 2 or 3 wherein the backing is selected from polyamide cellulose, polyester, polytetrafluoroethylene, polypropylene, polyethylene, ultrafiltration membranes.

* * * * *